(12) United States Patent
Faizakof et al.

(10) Patent No.: US 12,353,831 B2
(45) Date of Patent: Jul. 8, 2025

(54) INVERSE TEXT NORMALIZATION OF CONTACT CENTER COMMUNICATIONS

(71) Applicant: Genesys Cloud Services, Inc., Menlo Park, CA (US)

(72) Inventors: Avraham Faizakof, Tel Aviv (IL); Lev Haikin, Tel Aviv (IL); Rotem Maoz, Tel Aviv (IL); Eyal Orbach, Tel Aviv (IL); Nelly David, Tel Aviv (IL)

(73) Assignee: Genesys Cloud Services, Inc., Menlo Park, CA (US)

( * ) Notice: Subject to any disclaimer, the term of this patent is extended or adjusted under 35 U.S.C. 154(b) by 278 days.

(21) Appl. No.: 18/088,261

(22) Filed: Dec. 23, 2022

(65) Prior Publication Data
US 2024/0211690 A1 Jun. 27, 2024

(51) Int. Cl.
*G10L 15/26* (2006.01)
*G06F 40/295* (2020.01)
*G06V 30/19* (2022.01)

(52) U.S. Cl.
CPC ...... *G06F 40/295* (2020.01); *G06V 30/19093* (2022.01); *G10L 15/26* (2013.01)

(58) Field of Classification Search
None
See application file for complete search history.

(56) References Cited

U.S. PATENT DOCUMENTS

| | | | | |
|---|---|---|---|---|
| 5,970,449 A * | 10/1999 | Alleva | .................. | G06F 40/279 704/235 |
| 7,028,038 B1 * | 4/2006 | Pakhomov | ............ | G06F 40/284 707/765 |
| 12,182,498 B1 * | 12/2024 | Sunkara | ................ | G06F 40/279 |
| 2009/0157385 A1 * | 6/2009 | Tian | ........................ | G06F 40/40 704/9 |
| 2010/0076752 A1 * | 3/2010 | Zweig | ................... | G10L 15/063 704/235 |
| 2012/0197825 A1 * | 8/2012 | Medlock | ............... | G06F 3/0237 706/11 |
| 2015/0269136 A1 * | 9/2015 | Alphonso | ............... | G10L 15/26 704/9 |
| 2021/0256160 A1 * | 8/2021 | Hachey | .................. | G06N 20/00 |
| 2022/0292218 A1 * | 9/2022 | Zarecki | ............... | G06F 21/6254 |

(Continued)

OTHER PUBLICATIONS

Text Normalization and Inverse Text Normalization with NVIDIA NeMo published on Sep. 16, 2022 and retrieved from https://developer.nvidia.com/blog/text-normalization-and-inverse-text-normalization-with-nvidia-nemo/.*

(Continued)

*Primary Examiner* — Neeraj Sharma
(74) *Attorney, Agent, or Firm* — Taft Stettinius & Hollister LLP

(57) ABSTRACT

A method for inverse text normalization of contact center communications according to an embodiment includes performing named entity recognition on text from a contact center communication to identify one or more entities in the text, normalizing each of the identified one or more entities in the text using weighted finite-state transducers, and normalizing at least one entity identified in the text using a large language model in response to determining that the at least one entity identified in the text was unable to be normalized using the weighted finite-state transducers.

17 Claims, 15 Drawing Sheets

(56) References Cited

U.S. PATENT DOCUMENTS

| | | | | |
|---|---|---|---|---|
| 2023/0289536 A1* | 9/2023 | Gaur | ..................... | G06F 40/151 |
| 2024/0071366 A1* | 2/2024 | Bakhturina | ............. | G10L 13/08 |

OTHER PUBLICATIONS

International Search Report and Written Opinion received in co-pending PCT application having application No. PCT/US2023/083311 mailed on Mar. 25, 2024.

Anonymous: "Text Normalization and Inverse Normalization with NVIDIA NeMo : NVIDIA Technical Blog", Sep. 16, 2022, XP093141722, Retrieved from the Internet: URL https://developer.nvidia.com/blog/text-normalization-and-inverse-text-normalization-with-nvidia-nemo/.

Anonymous: "Text Normalization and Inverse Normalization with NVIDIA NeMo : NVIDIA Technical Blog", Dec. 4, 2022, XP093141720, Retrieved from the Internet: URL https://developer.nvidia.com/blog/text-normalization-and-inverse-text-normalization-with-nvidia-nemo/.

Sunkara Monica et al: "Neural Inverse Text Normalization", ICASSP 2021-2021 IEEE International Conference on Acoustics, Speech and Signal Processing (ICASSP), IEEE, Jun. 6, 2021, pp. 7573-7577, XP033954844, DOI: 10.1109/ICASSP39728.2021.9414912 Sections 1 to 4.

Ernest Pusateri et al: "A Mostly Data-Driven Approach to Inverse Text Normalization", Interspeech 2017, Aug. 20, 2017, pp. 2784-2788, XP055634676, Stockholm, DOI: 10.21437/Interspeech.2017-1274 Sections 1-4.

Zhang, Hao et al.; Neural Models of Text Normalization for Speech Applications; Computational Linguistics; 2019; pp. 294-337; vol. 45, No. 2.

Zhang, Yang et al.; NeMo Inverse Text Normalization: From Development To Production; May 17, 2021; 5 pages.

\* cited by examiner

| | |
|---|---|
| customer: can you repeat what you just said | customer: can you repeat what you just said |
| agent: oh can you please provide me what's your phone number the one that you have with us | agent: oh can you please provide me what's your phone number the one that you have with us |
| customer: one nine three six nine oh oh four oh five | customer: 1-936-900-405 |
| agent: thank you in case we need to reach you can you please provide me a good call back number | agent: thank you in case we need to reach you can you please provide me a good call back number |
| customer: hold on | customer: hold on |
| customer: sure | customer: sure |
| customer: three eight two two forty nine hundred | customer: 3-822-240-900 |
| agent: thank you and for your security purposes can you please provide me what's your pin number | agent: thank you and for your security purposes can you please provide me what's your pin number |
| customer: eight one eight three three | customer: 81833 |
| agent: mhm | agent: mhm |
| agent: eight one eight three three | agent: 81833 |
| customer: yes | customer: yes |

FIG. 5

| Example | (Wrong) System Results | Correct Normalization |
|---|---|---|
| april seven two | april 7 2002 | april 72 |
| five seven o | 5 07 o | 5 70 |
| four december twelfth | december 2004 | 4 december 12th |
| january eh two thousand nine | january 2nd 2009 | january eh 2009, january 2009 |
| o one two five seven eight | 01 02 05 07 08 | 01 25 78 |

FIG. 9

| Example | (Wrong) System Results | Correct Normalization |
|---|---|---|
| one nine five seven | 1 9 5 7 | 1 9 5 7 |
| one nine six three | 1 9 6 3 | 1 9 6 3 |
| twenty fourth of the sixth nineteen ninety one | 24th june 91 | 24th 6th 1991 |
| twenty ninth of the april nineteen seventy nine | 29th april 79 | 29th april 1979 |

FIG. 10

| Original Text | (Inverse) Normalized Text |
|---|---|
| we'll need to get to confirm this bank account first | we'll need to get to confirm this bank account 1st |
| i'll arrange for one of our team to give you a call back | i'll arrange for 1 of our team to give you a call back |
| one second | 1 2$^{nd}$ |
| is seventeen twenty five and eight three four south | is 17:25 and 834 south |

FIG. 11

| Tag | Description |
| --- | --- |
| CARD_NUMBER | Credit card numbers and CVVs |
| CURRENCY | Money amount |
| DATE | Absolute dates ("June 3$^{rd}$") |
| DATE_REL | Dates for which you must know todays date ("tomorrow", "next Tuesday") |
| GEO | Addresses, names of locations |
| ORG | Names of organizations |
| PERSON | People names |
| PHONE_NUMBER | Phone numbers |
| PIIOTHER | Any PII that doesn't have a dedicated tag. Account numbers, license plate numbers, and many others |
| PRODUCT | Product names. |
| SPELL_OUT | Spelling of anything, e.g. Ashley a s h l e y |
| SSN | Social security numbers, and ID numbers of other nationalities |
| TIME | Time of day |
| URL | URLs |
| USERINFO | User information, like emails, passwords, and usernames |
| ZIP_CODE | Zip codes |
| NORMALIZE | Any sequence of words that needs to be normalized, but isn't included in the list above |

1302 → In English, numbers can be written as words or written using digits. There is a segment with spoken dates, and then their normalized form.

1304 → Words: friday the twentieth
Normalized: Friday 20th

1304 → Words: tuesday september seventeenth
Normalized: Tuesday September 17th

1304 → Words: the sixteenth June
Normalized: 16th June

1304 → Words: couple days ago
Normalized: couple days ago

1304 → Words: ninth august nineteen
Normalized: 9th August 19

1304 → Words: zero nine two thousand and six
Normalized:

FIG. 13

|  | Random Selection | Most Similar Selection |
|---|---|---|
| True Positive (%) | 19.87 | 37.5 |
| False Positive (%) | 27.15 | 13.16 |
| True Negative (%) | 34.44 | 35.53 |
| False Negative (%) | 18.54 | 13.82 |

FIG. 14

INVERSE TEXT NORMALIZATION OF CONTACT CENTER COMMUNICATIONS

BACKGROUND

In contact center analytics, speech recognition is used to transcribe conversations between agents and customers, for example, for detecting important events, detecting sentiment, summarizing the content of the conversations, and/or various other purposes. In some circumstances, calls may be automatically transcribed in a contact center such that the transcription can be displayed to the agent or supervisor during or after the call. The output from a speech recognition system generally includes a sequence of words that are spelled out in the text exactly as they are spoken. For example, dates, numbers, and addresses are presented in text format instead of a common numerical format in which a human would expect to read that information. As such, automatic transcripts are often less readable than human-generated transcripts, because human-generated transcripts are normalized in that they contain information such as numerical entities (e.g., dates, numbers, etc.) in a format that is reader-friendly for humans.

SUMMARY

One embodiment is directed to a unique system, components, and methods for inverse text normalization of contact center communications. Other embodiments are directed to apparatuses, systems, devices, hardware, methods, and combinations thereof for inverse text normalization of contact center communications.

According to an embodiment, a method for inverse text normalization of contact center communications may include performing named entity recognition on text from a contact center communication to identify one or more entities in the text, normalizing each of the identified one or more entities in the text using weighted finite-state transducers, and normalizing at least one entity identified in the text using a large language model in response to determining that the at least one entity identified in the text was unable to be normalized using the weighted finite-state transducers.

In some embodiments, the contact center communication may include a speech-to-text transcript of at least a portion of a contact center conversation with a user.

In some embodiments, normalizing each of the identified one or more entities in the text using weighted finite-state transducers may include normalizing a plurality of identified entities in the text using weighted finite-state transducers.

In some embodiments, normalizing the plurality of identified entities in the text using weighted finite-state transducers may include using a dedicated graph for each entity type of the plurality of identified entities.

In some embodiments, normalizing the at least one entity identified in the text using the large language model may include receiving, for each entity of the at least one entity, entity text associated with the respective entity identified in the text, comparing the entity text to a set of training examples for the large language model, selecting training examples from the set of training examples that are most similar to the entity text, and applying the large language model to the entity text using a large language model prompt that includes the selected training examples.

In some embodiments, selecting the training examples from the set of training examples that are most similar to the entity text may include selecting training examples from the set of training examples that share the most common words.

In some embodiments, selecting the training examples from the set of training examples that are most similar to the entity text may include selecting at least five training examples.

In some embodiments, normalizing the at least one entity identified in the text using the large language model may include calculating an average of probabilities from word-probability pairs output by the large language model, determining whether the average exceeds a predefined confidence threshold, and accepting a normalization output of the large language model in response to determining that the average exceeds the predefined confidence threshold.

In some embodiments, the method may further include rejecting the normalization output of the large language model in response to determining that the average does not exceed the predefined confidence threshold.

In some embodiments, performing the named entity recognition on the text from the contact center communication to identify the one or more entities in the text may include identifying at least one of a date, a phone number, a currency, a social security number, a time of day, or a zip code.

According to another embodiment, a computing system for inverse text normalization of contact center communications may include at least one processor and at least one memory comprising a plurality of instructions stored thereon that, in response to execution by the at least one processor, causes the computing system to perform named entity recognition on text from a contact center communication to identify one or more entities in the text, normalize each of the identified one or more entities in the text using weighted finite-state transducers, and normalize at least one entity identified in the text using a large language model in response to a determination that the at least one entity identified in the text was unable to be normalized using the weighted finite-state transducers.

In some embodiments, the contact center communication may include a speech-to-text transcript of at least a portion of a contact center conversation with a user.

In some embodiments, to normalize each of the identified one or more entities in the text using weighted finite-state transducers may include to normalize a plurality of identified entities in the text using weighted finite-state transducers.

In some embodiments, to normalize the plurality of identified entities in the text using weighted finite-state transducers may include to use a dedicated graph for each entity type of the plurality of identified entities, and the plurality of identified entities may represent a plurality of different entity types.

In some embodiments, to normalize the at least one entity identified in the text using the large language model may include to receive, for each entity of the at least one entity, entity text associated with the respective entity identified in the text, compare the entity text to a set of training examples for the large language model, select training examples from the set of training examples that are most similar to the entity text, and apply the large language model to the entity text using a large language model prompt that includes the selected training examples.

In some embodiments, to select the training examples from the set of training examples that are most similar to the entity text may include to select training examples from the set of training examples that share the most common words.

In some embodiments, to normalize the at least one entity identified in the text using the large language model may include to calculate an average of probabilities from word-probability pairs output by the large language model, determine whether the average exceeds a predefined confidence threshold, accept a normalization output of the large language model in response to a determination that the average exceeds the predefined confidence threshold, and reject the normalization output of the large language model in response to a determination that the average does not exceed the predefined confidence threshold.

According to yet another embodiment, one or more non-transitory machine-readable storage media may include a plurality of instructions stored thereon that, in response to execution by a processor, causes a computing system to perform named entity recognition on text from a contact center communication to identify a plurality of entities in the text, normalize each entity of the plurality of entities identified in the text using weighted finite-state transducers and using a dedicated graph for each entity type of the plurality of entities identified in the text, determine that at least one entity identified in the text was unable to be normalized using the weighted finite-state transducers, and normalize the at least one entity identified in the text using a large language model.

In some embodiments, to normalize the at least one entity identified in the text using the large language model may include to receive, for each entity of the at least one entity, entity text associated with the respective entity identified in the text, compare the entity text to a set of training examples for the large language model, select training examples from the set of training examples that are most similar to the entity text, and apply the large language model to the entity text using a large language model prompt that includes the selected training examples.

In some embodiments, to normalize the at least one entity identified in the text using the large language model may include to calculate an average of probabilities from word-probability pairs output by the large language model, determine whether the average exceeds a predefined confidence threshold, accept a normalization output of the large language model in response to a determination that the average exceeds the predefined confidence threshold, and reject the normalization output of the large language model in response to a determination that the average does not exceed the predefined confidence threshold.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 5 is an example of un-normalized text and corresponding normalized text from a contact center communication;

FIG. 9 illustrates various examples of unrecoverable errors made by a normalization system;

FIG. 10 illustrates various examples of recoverable errors made by a normalization system;

FIG. 11 illustrates various examples of input text and normalization errors;

FIG. 12 is a table that describes various named entity types and corresponding descriptions;

FIG. 13 is an example of text used to construct a prompt for a large language model;

FIG. 14 is a table that provides results from an experimental test comparing randomly selection to most similar selection of training examples for a large language model prompt.

DETAILED DESCRIPTION

Figure 1:
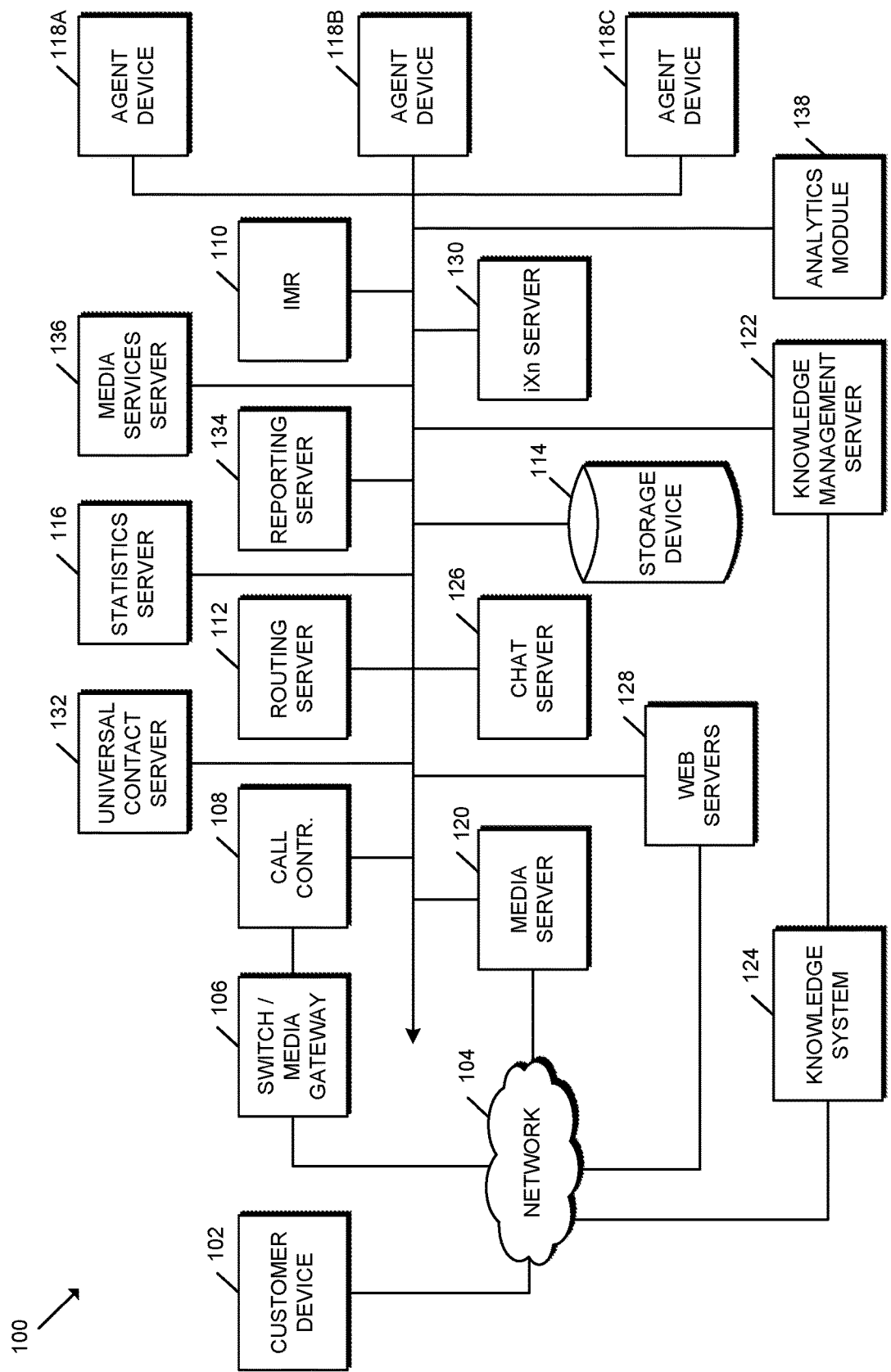
FIG. 1 depicts a simplified block diagram of at least one embodiment of a contact center system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

It should be appreciated that contact center systems utilize speech recognition for various circumstances, and the output from a speech recognition system generally includes a sequence of words that are spelled out in the text exactly as they are spoken, rather than a more human-friendly format. It should be appreciated that the process of converting text to words (e.g., "19" to "nineteen"), for example, as may be performed in text-to-speech (TTS) systems to verbalize a word (e.g., "nineteen"), is referred to as "normalization." The inverse process of normalizing speech recognition text (e.g., "nineteen" to "19"), for example, as may be performed to display numerical values in a more readable format for a human reader, is referred to as "inverse text normalization." However, because the context is clear from the disclosure, inverse text normalization may be referred to herein as "normalization" for simplicity and brevity of the description.

FIG. 5 is a table that provides an example of un-normalized text (e.g., as would be output from a speech recognition module) in the first column and corresponding normalized text in the second column. When comparing the un-normalized text to the normalized text, it should be appreciated that the majority of the text remains the same; however, text including numbers (as shown in bold/underlined text) has been normalized (e.g., through inverse text normalization) to present the text in the expected human-readable numerical format. More specifically, "one nine three six nine oh oh four oh five" has been recognized to be an Israeli phone number and normalized to be "1-936-900-405", "three eight two two two forty nine hundred" has similarly been recognized to be an international phone number and normalized to be "3-822-240-900", and "eight one eight three three" has been recognized to be a PIN number and normalized to be "81833".

Figure 6:
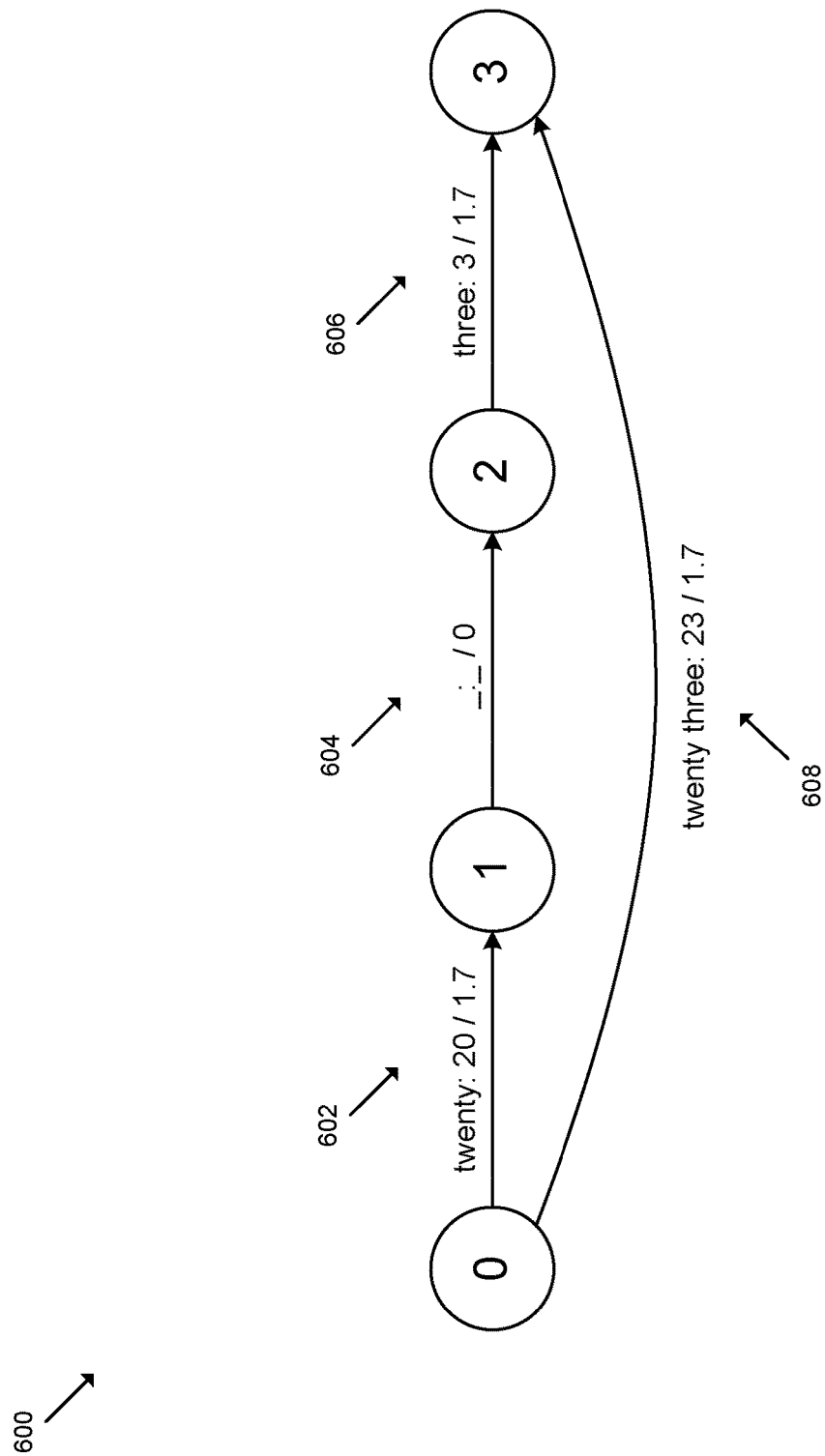
FIGS. 6-8 illustrate various examples of weighted finite-state transducer (WFST) graphs.

Many different approaches may be used to perform inverse text normalization, each with its own set of benefits and drawbacks. For example, in various embodiments, a normalization system may rely on graph-based methods or deep neural networks. Graph-based methods may rely on weighted finite-state transducers (WFSTs) to map a sequence of input symbols into a sequence of output symbols, where each output path has an associated weight/cost. For example, FIG. 6 illustrates a graph 600 (or partial graph) that converts the word sequence "twenty three" to either of the paths "20 3" or "23". As shown, the path for "20 3" includes three sub-paths with corresponding weights-sub-path 602 for "20" with an associated weight/cost of 1.7, sub-path 604 for [space] with an associated weight/cost of 0, and sub-path 606 for "3" with an associated weight/cost of 1.7—and having a total cost of 3.4. However, the path for "23" includes a single sub-path 608 for "23" with an associated weight/cost of 1.7. Because the total weight/cost of the path for "23" is less than the weight/cost of the path for "20 3", the system selects that path.

It should be appreciated that, for text normalization applications, the input for the graphs is typically a sequence of words of a known entity. For example, the sequence of words may be an address that needs to be verbalized in a text-to-speech system, such as in a satellite navigation system. However, with inverse text normalization, the input to the graphs is often complete sentences as they are output from a speech recognition system. Within those complete sentences, there may or may not be a sub-string that requires normalization, and the normalization graph does not know if there is a string that needs to be normalized and, if so, where that string is located within the complete text.

Figure 7:
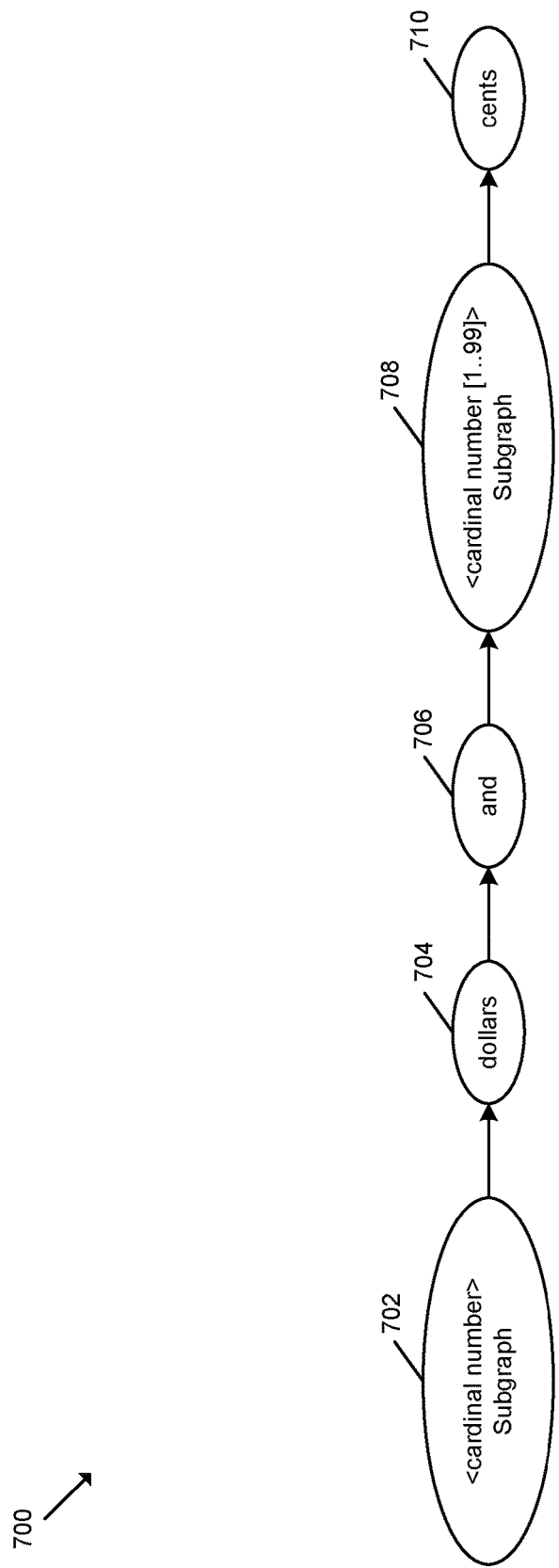
Figure 8:
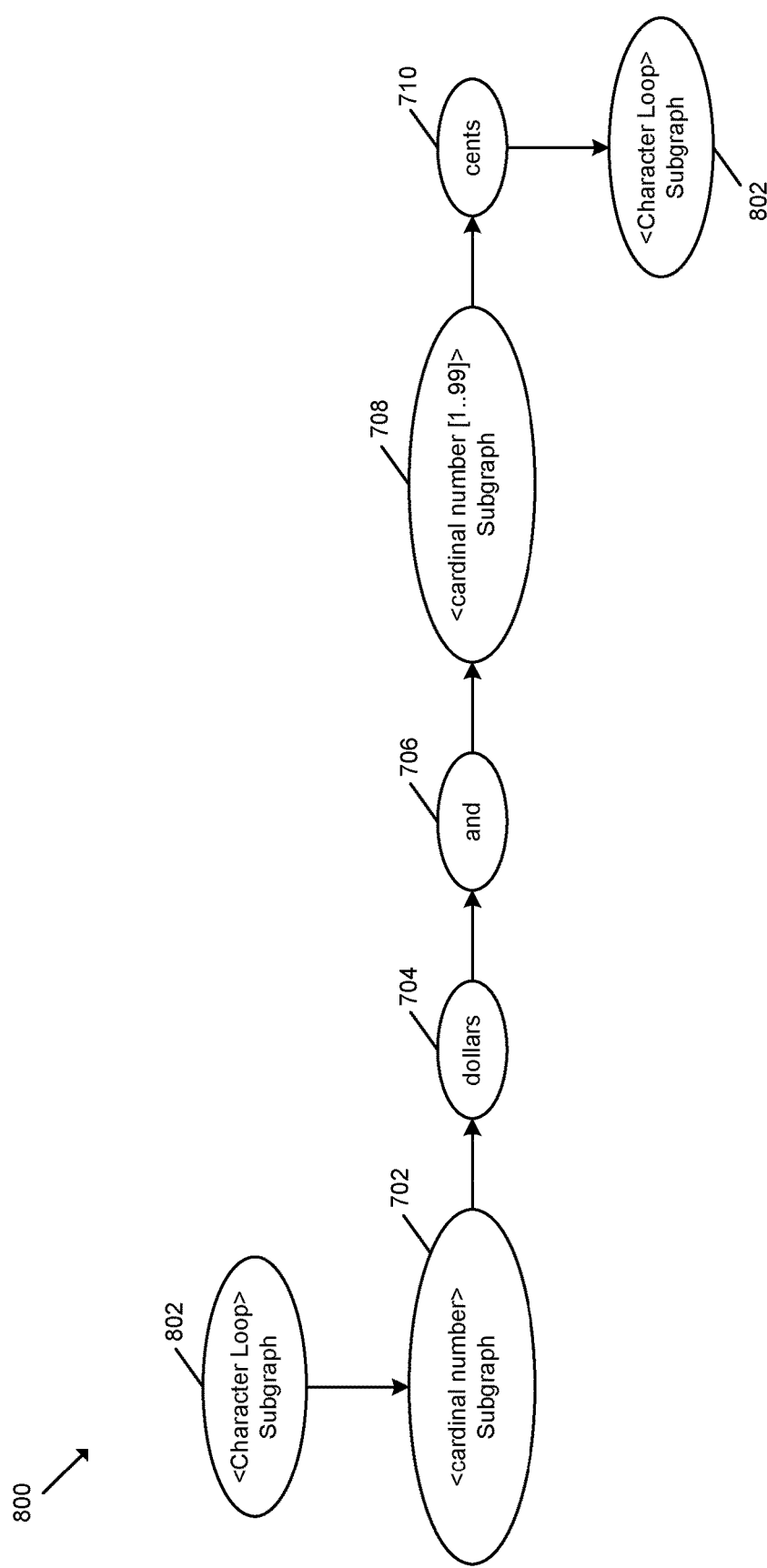

A normalization graph may be built from sub-components called "sub-graphs," which may be instantiated in some structure relative to one another (e.g., concatenated, instantiated in parallel, etc.). One of the more important sub-graphs is the "Cardinal Number" sub-graph, which may be instantiated inside normalization graphs for other entities, because digits and numbers constitute a large portion of content that needs to be normalized from text output by speech recognition systems. The cardinal numbers subgraph converts text digits in their word form into a numerical form. By way of example, FIG. 7 illustrates a currency normalization graph 700 that normalizes a dollar amount or, more specifically, normalizes text that follows the format of "X dollars and Y cents," where X can be any number and Y can be any number between 1 and 99. As shown, the currency normalization graph 700 includes a cardinal number sub-graph 702, the word "dollars" 704, the word "and" 706, a cardinal number sub-graph 708 limited to numbers between 1 and 99, and the word "cents" 710. However, as indicated above, in some embodiments, the text to be normalized may fall within a larger section of text. Accordingly, in some embodiments, the currency normalization graph 700 of FIG. 7 may be modified to include a "character loop" sub-graph 802 at the beginning and end of the graph, as illustrated by the currency normalization graph 800 of FIG. 8. It should be appreciated that the "character loop" sub-graph 802 simply accepts and outputs the same character for all characters in the language. In other embodiments, the sub-graph 700, 800 could be further modified by incorporating a "currency subgraph" to account for multiple types of currency (e.g., dollars and euros). In another embodiment, a global normalization graph may be constructed such that sub-graphs similar to those described above are instantiated in parallel with a character loop sub-graph at the beginning and end. It should be understood that graph-based normalization is characterized by very high precision, but often at the cost of relatively low recall, because graphs are constructed manually and generally do not include all of the variability of human speech.

As described above, in other embodiments, normalization technologies may rely on deep neural networks. In such embodiments, a sequence of words may be input into the neural network, which may output a sequence of words with normalized sections. However, in order to train a neural network for normalization, a substantial amount of annotated training material is used, in which human annotators convert every spoken word sequence to its counterpart normalized form. Additionally, other drawbacks to the use of a neural network for normalization include that the neural network typically attempts to generate a normalized output even if the normalized output is wrong, and biased training material can lead to normalization errors. For example, the neural network may output "The price is $30" when the input was "the price is thirty euro" if the training data includes a significant number of prices in dollars with too few in euros.

There are two different types of errors made by inverse text normalization systems: unrecoverable errors and recoverable errors. Unrecoverable errors are those that, when made, change the semantic meaning of the text. Recoverable errors are those for which the output may be suboptimal but the human reader can still determine the correct information by reading the text. The example above regarding normalization of "the price is thirty euro" as "The price is $30" is an example of an unrecoverable error, because the reader of the normalized text is unable to determine that the original audio actually referenced the price in euros. FIG. 9 illustrates various other examples of unrecoverable errors, and FIG. 10 illustrates various examples of recoverable errors.

As described in greater detail below, the inverse text normalization technologies described herein may involve performing named entity recognition on text from a contact center communication to identify entities referenced within the text, normalizing each of those entities using weighted finite-state transducers, and for those entities identified in the text that were unable to be normalized using the weighted finite-state transducers, normalizing them using a large language model.

Referring now to FIG. 1, a simplified block diagram of at least one embodiment of a communications infrastructure and/or content center system, which may be used in conjunction with one or more of the embodiments described herein, is shown. The contact center system 100 may be embodied as any system capable of providing contact center services (e.g., call center services, chat center services, SMS center services, etc.) to an end user and otherwise performing the functions described herein. The illustrative contact center system 100 includes a customer device 102, a network 104, a switch/media gateway 106, a call controller 108, an interactive media response (IMR) server 110, a routing server 112, a storage device 114, a statistics server 116, agent devices 118A, 118B, 118C, a media server 120, a knowledge management server 122, a knowledge system 124, chat server 126, web servers 128, an interaction (iXn) server 130, a universal contact server 132, a reporting server 134, a media services server 136, and an analytics module 138. Although only one customer device 102, one network 104, one switch/media gateway 106, one call controller 108, one IMR server 110, one routing server 112, one storage device 114, one statistics server 116, one media server 120, one knowledge management server 122, one knowledge system 124, one chat server 126, one iXn server 130, one universal contact server 132, one reporting server 134, one media services server 136, and one analytics module 138 are shown in the illustrative embodiment of FIG. 1, the contact center system 100 may include multiple customer devices 102, networks 104, switch/media gateways 106, call controllers 108, IMR servers 110, routing servers 112, storage devices 114, statistics servers 116, media servers 120, knowledge management servers 122, knowledge systems 124, chat servers 126, iXn servers 130, universal contact servers 132, reporting servers 134, media services servers 136, and/or analytics modules 138 in other embodiments. Further, in some embodiments, one or more of the components described herein may be excluded from the system 100, one or more of the components described as being independent may form a portion of another component, and/or one or more of the component described as forming a portion of another component may be independent.

It should be understood that the term "contact center system" is used herein to refer to the system depicted in FIG. 1 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 100), the associated customer service provider (such as a particular customer service provider/agent providing customer services through the contact center system 100), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals," "customers," or "contact center clients"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 100 may be used by a customer service provider to provide various types of services to customers. For example, the contact center system 100 may be used to engage and manage interactions in which automated processes (or bots) or human agents communicate with customers. As should be understood, the contact center system 100 may be an in-house facility to a business or enterprise for performing the functions of sales and customer service relative to products and services available through the enterprise. In another embodiment, the contact center system 100 may be operated by a third-party service provider that contracts to provide services for another organization. Further, the contact center system 100 may be deployed on equipment dedicated to the enterprise or third-party service provider, and/or deployed in a remote computing environment such as, for example, a private or public cloud environment with infrastructure for supporting multiple contact centers for multiple enterprises. The contact center system 100 may include software applications or programs, which may be executed on premises or remotely or some combination thereof. It should further be appreciated that the various components of the contact center system 100 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 200, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

Figure 2:
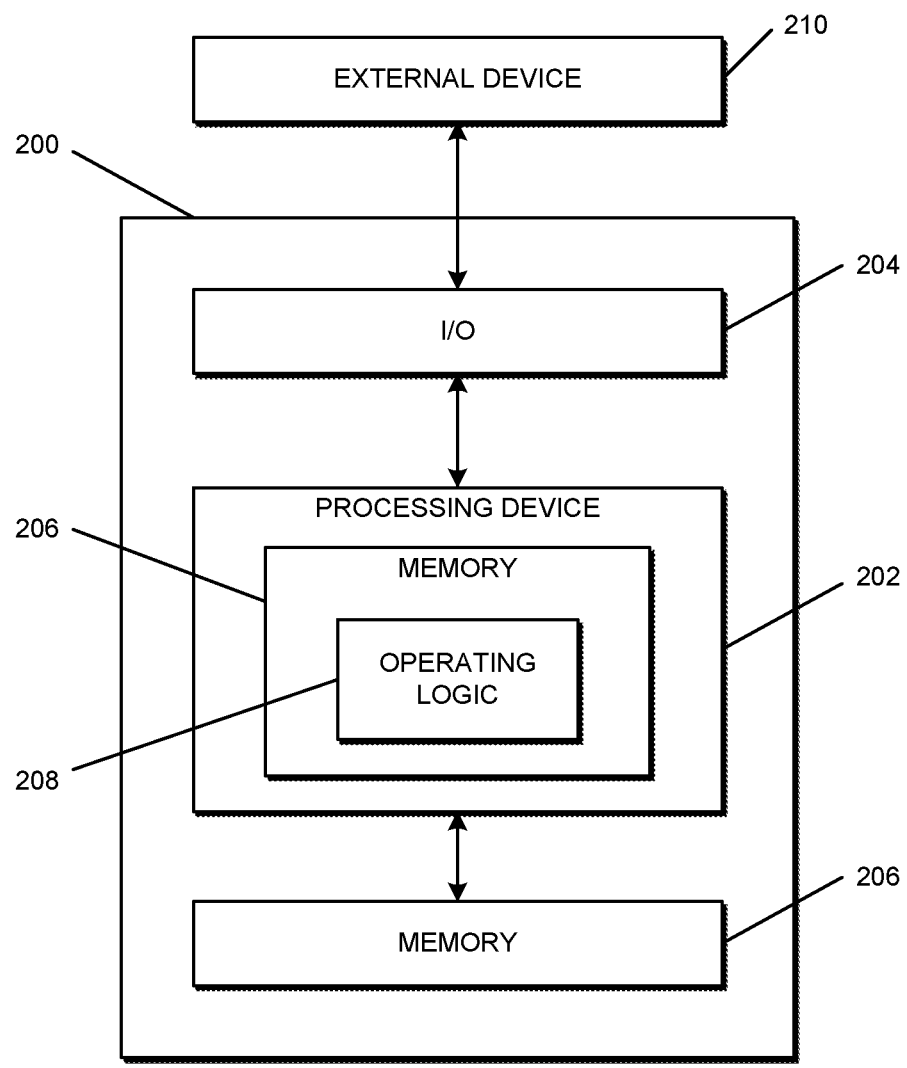
FIG. 2 is a simplified block diagram of at least one embodiment of a computing device.

It should be understood that any of the computer-implemented components, modules, or servers described in relation to FIG. 1 may be implemented via one or more types of computing devices, such as, for example, the computing device 200 of FIG. 2. As will be seen, the contact center system 100 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 100 may initiate inbound communications (e.g., telephone calls, emails, chats, etc.) to the contact center system 100 via a customer device 102. While FIG. 1 shows one such customer device—i.e., customer device 102—it should be understood that any number of customer devices 102 may be present. The customer devices 102, for example, may be a communication device, such as a telephone, smart phone, computer, tablet, or laptop. In accordance with functionality described herein, customers may generally use the customer devices 102 to initiate, manage, and conduct communications with the contact center system 100, such as telephone calls, emails, chats, text messages, web-browsing sessions, and other multi-media transactions.

Inbound and outbound communications from and to the customer devices 102 may traverse the network 104, with the nature of the network typically depending on the type of customer device being used and the form of communication. As an example, the network 104 may include a communication network of telephone, cellular, and/or data services. The network 104 may be a private or public switched telephone network (PSTN), local area network (LAN), private wide area network (WAN), and/or public WAN such as the Internet. Further, the network 104 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 106 may be coupled to the network 104 for receiving and transmitting telephone calls between customers and the contact center system 100. The switch/media gateway 106 may include a telephone or communication switch configured to function as a central switch for agent level routing within the center. The switch may be a hardware switching system or implemented via software. For example, the switch 106 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 118. Thus, in general, the switch/media gateway 106 establishes a voice connection between the customer and the agent by establishing a connection between the customer device 102 and agent device 118.

As further shown, the switch/media gateway 106 may be coupled to the call controller 108 which, for example, serves as an adapter or interface between the switch and the other routing, monitoring, and communication-handling components of the contact center system 100. The call controller 108 may be configured to process PSTN calls, VOIP calls, and/or other types of calls. For example, the call controller 108 may include computer-telephone integration (CTI) software for interfacing with the switch/media gateway and other components. The call controller 108 may include a session initiation protocol (SIP) server for processing SIP calls. The call controller 108 may also extract data about an incoming interaction, such as the customer's telephone number, IP address, or email address, and then communicate these with other contact center components in processing the interaction.

The interactive media response (IMR) server 110 may be configured to enable self-help or virtual assistant functionality. Specifically, the IMR server 110 may be similar to an interactive voice response (IVR) server, except that the IMR server 110 is not restricted to voice and may also cover a variety of media channels. In an example illustrating voice, the IMR server 110 may be configured with an IMR script for querying customers on their needs. For example, a contact center for a bank may instruct customers via the IMR script to "press 1" if they wish to retrieve their account balance. Through continued interaction with the IMR server 110, customers may receive service without needing to speak with an agent. The IMR server 110 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 112 may function to route incoming interactions. For example, once it is determined that an inbound communication should be handled by a human agent, functionality within the routing server 112 may select the most appropriate agent and route the communication thereto. This agent selection may be based on which available agent is best suited for handling the communication. More specifically, the selection of appropriate agent may be based on a routing strategy or algorithm that is implemented by the routing server 112. In doing this, the routing server 112 may query data that is relevant to the incoming interaction, for example, data relating to the particular customer, available agents, and the type of interaction, which, as described herein, may be stored in particular databases. Once the agent is selected, the routing server 112 may interact with the call controller 108 to route (i.e., connect) the incoming interaction to the corresponding agent device 118. As part of this connection, information about the customer may be provided to the selected agent via their agent device 118. This information is intended to enhance the service the agent is able to provide to the customer.

It should be appreciated that the contact center system 100 may include one or more mass storage devices—represented generally by the storage device 114—for storing data in one or more databases relevant to the functioning of the contact center. For example, the storage device 114 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 114 may store agent data in an agent database. Agent data maintained by the contact center system 100 may include, for example, agent availability and agent profiles, schedules, skills, handle time, and/or other relevant data. As another example, the storage device 114 may store interaction data in an interaction database. Interaction data may include, for example, data relating to numerous past interactions between customers and contact centers. More generally, it should be understood that, unless otherwise specified, the storage device 114 may be configured to include databases and/or store data related to any of the types of information described herein, with those databases and/or data being accessible to the other modules or servers of the contact center system 100 in ways that facilitate the functionality described herein. For example, the servers or modules of the contact center system 100 may query such databases to retrieve data stored therein or transmit data thereto for storage. The storage device 114, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 116 may be configured to record and aggregate data relating to the performance and operational aspects of the contact center system 100. Such information may be compiled by the statistics server 116 and made available to other servers and modules, such as the reporting server 134, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 118 of the contact center system 100 may be communication devices configured to interact with the various components and modules of the contact center system 100 in ways that facilitate functionality described herein. An agent device 118, for example, may include a telephone adapted for regular telephone calls or VOIP calls. An agent device 118 may further include a computing device configured to communicate with the servers of the contact center system 100, perform data processing associated with operations, and interface with customers via voice, chat, email, and other multimedia communication mechanisms according to functionality described herein. Although FIG. 1 shows three such agent devices 118—i.e., agent devices 118A, 118B and 118C—it should be understood that any number of agent devices 118 may be present in a particular embodiment.

The multimedia/social media server 120 may be configured to facilitate media interactions (other than voice) with the customer devices 102 and/or the servers 128. Such media interactions may be related, for example, to email, voice mail, chat, video, text-messaging, web, social media, co-browsing, etc. The multimedia/social media server 120 may take the form of any IP router conventional in the art with specialized hardware and software for receiving, processing, and forwarding multi-media events and communications.

The knowledge management server 122 may be configured to facilitate interactions between customers and the knowledge system 124. In general, the knowledge system 124 may be a computer system capable of receiving questions or queries and providing answers in response. The knowledge system 124 may be included as part of the contact center system 100 or operated remotely by a third party. The knowledge system 124 may include an artificially intelligent computer system capable of answering questions posed in natural language by retrieving information from information sources such as encyclopedias, dictionaries, newswire articles, literary works, or other documents submitted to the knowledge system 124 as reference materials. As an example, the knowledge system 124 may be embodied as IBM Watson or a similar system.

The chat server 126, it may be configured to conduct, orchestrate, and manage electronic chat communications with customers. In general, the chat server 126 is configured to implement and maintain chat conversations and generate chat transcripts. Such chat communications may be conducted by the chat server 126 in such a way that a customer communicates with automated chatbots, human agents, or both. In exemplary embodiments, the chat server 126 may perform as a chat orchestration server that dispatches chat conversations among the chatbots and available human agents. In such cases, the processing logic of the chat server 126 may be rules driven so to leverage an intelligent workload distribution among available chat resources. The chat server 126 further may implement, manage, and facilitate user interfaces (UIs) associated with the chat feature, including those UIs generated at either the customer device 102 or the agent device 118. The chat server 126 may be configured to transfer chats within a single chat session with a particular customer between automated and human sources such that, for example, a chat session transfers from a chatbot to a human agent or from a human agent to a chatbot. The chat server 126 may also be coupled to the knowledge management server 122 and the knowledge systems 124 for receiving suggestions and answers to queries posed by customers during a chat so that, for example, links to relevant articles can be provided.

The web servers 128 may be included to provide site hosts for a variety of social interaction sites to which customers subscribe, such as Facebook, Twitter, Instagram, etc. Though depicted as part of the contact center system 100, it should be understood that the web servers 128 may be provided by third parties and/or maintained remotely. The web servers 128 may also provide webpages for the enterprise or organization being supported by the contact center system 100. For example, customers may browse the webpages and receive information about the products and services of a particular enterprise. Within such enterprise webpages, mechanisms may be provided for initiating an interaction with the contact center system 100, for example, via web chat, voice, or email. An example of such a mechanism is a widget, which can be deployed on the webpages or websites hosted on the web servers 128. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 130 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 130 may be configured to interact with the routing server 112 for selecting an appropriate agent to handle each of the deferrable activities. Once assigned to a particular agent, the deferrable activity is pushed to that agent so that it appears on the agent device 118 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 118 may include a workbin. As an example, a workbin may be maintained in the buffer memory of the corresponding agent device 118.

The universal contact server (UCS) 132 may be configured to retrieve information stored in the customer database and/or transmit information thereto for storage therein. For example, the UCS 132 may be utilized as part of the chat feature to facilitate maintaining a history on how chats with a particular customer were handled, which then may be used as a reference for how future chats should be handled. More generally, the UCS 132 may be configured to facilitate maintaining a history of customer preferences, such as preferred media channels and best times to contact. To do this, the UCS 132 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 134 may be configured to generate reports from data compiled and aggregated by the statistics server 116 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 136 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), screen recording, speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 138 may be configured to provide systems and methods for performing analytics on data received from a plurality of different data sources as functionality described herein may require. In accordance with example embodiments, the analytics module 138 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 138 may have access to the data stored in the storage device 114, including the customer database and agent database. The analytics module 138 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 138 may be configured to retrieve data stored within the storage device 114 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 138 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 138 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 1 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VOIP calls), emails, vmails, video, chat, screen-sharing, text messages, social media messages, WebRTC calls, etc. Access to and control of the components of the contact center system 100 may be affected through user interfaces (UIs) which may be generated on the customer devices 102 and/or the agent devices 118.

As noted above, in some embodiments, the contact center system 100 may operate as a hybrid system in which some or all components are hosted remotely, such as in a cloud-based or cloud computing environment. It should be appreciated that each of the devices of the contact center system 100 may be embodied as, include, or form a portion of one or more computing devices similar to the computing device 200 described below in reference to FIG. 2.

Referring now to FIG. 2, a simplified block diagram of at least one embodiment of a computing device 200 is shown. The illustrative computing device 200 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 200, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein-such as the contact center system 100 of FIG. 1—the various servers and computer devices thereof may be located on local computing devices 200 (e.g., on-site at the same physical location as the agents of the contact center), remote computing devices 200 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IOT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as one or more of the devices/systems described herein, and/or a portion thereof. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

The computing device 200 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 200 may communicate with other computing devices 200 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 200 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 3:
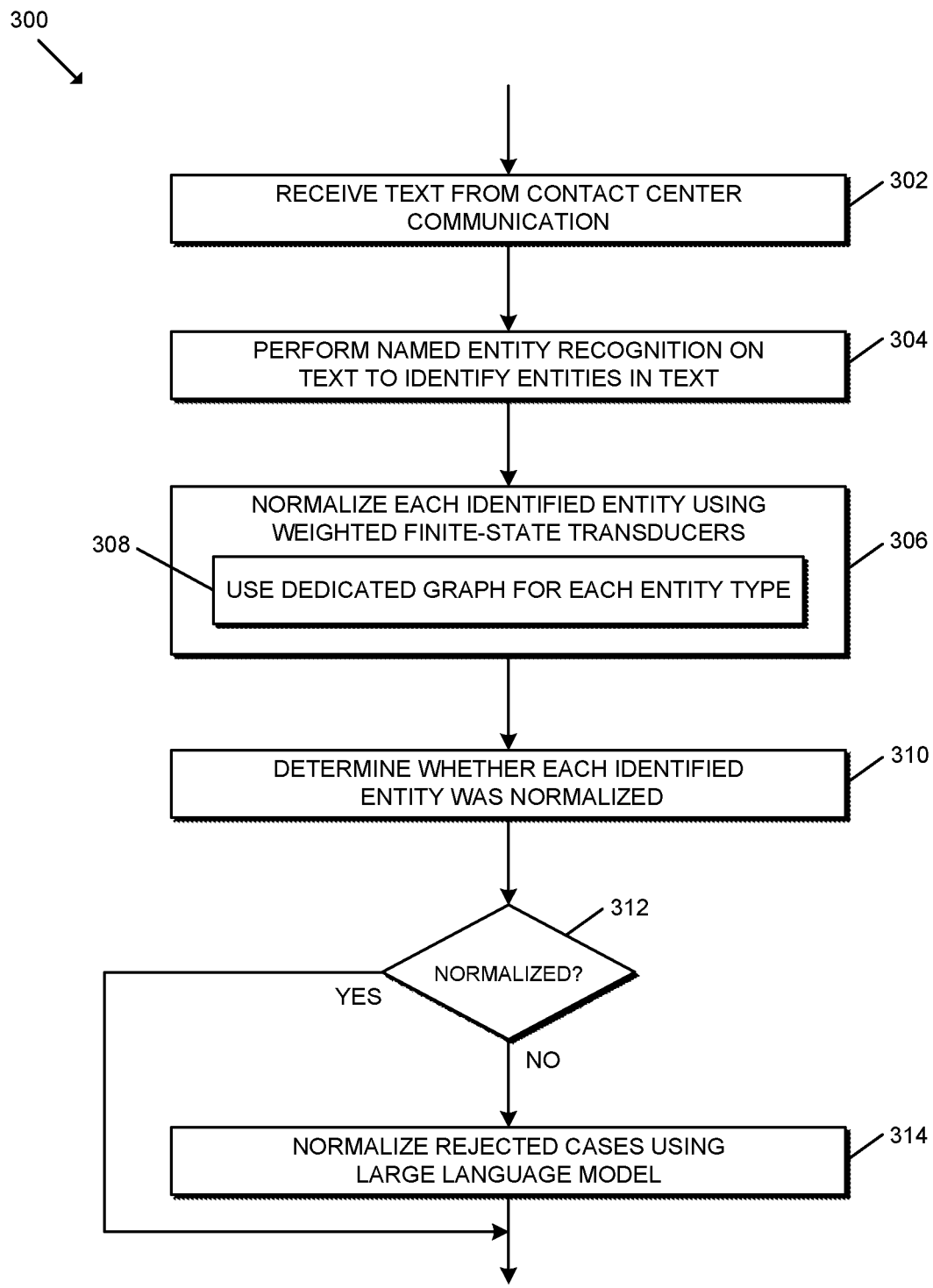
FIG. 3 is a simplified flow diagram of at least one embodiment of a method for inverse text normalization of contact center communications.

Referring now to FIG. 3, in use, a computing system (e.g., the contact center system 100 and/or computing device 200) may execute a method 300 for inverse text normalization of contact center communications. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the computing system receives text from a contact center communication. For example, in some embodiments, the computing system may receive a speech-to-text transcript (in full or in part) of a contact center conversation with a user (e.g., between an agent and a user, between a chatbot and a user, etc.). It should be appreciated that the text may be received by the computing system in real-time, in near real-time, or at some time subsequent to when the conversation occurred.

In block 304, the computing system performs named entity recognition on the text to identify entities in the text. It should be appreciated that named entity recognition involves analyzing unstructured text and classifying named entities mentioned in that text according to predefined categories such as numbers, names, currency, locations, and other types of entities. It should be further appreciated that the computing system may utilize any named entity recognition technology or service suitable for performing the functions described herein. In some embodiments, the output of the named entity recognition includes a sub-section of the text and a corresponding entity type/class for each of the identified entities. In other words, the named entity recognition system identifies boundaries within the broader text for the named entity.

For example, the table of FIG. 12 describes various named entities that could be identified in at least one embodiment. More specifically, the named entities in such embodiments may include CARD_NUMBER (e.g., credit card numbers and CVVs), CURRENCY (e.g., money amount), DATE (e.g., absolute dates such as "June $3^{rd}$"), DATE_REL (e.g., dates for which today's date must be known, such as "tomorrow" and "next Tuesday"), GEO (e.g., addresses and names of locations), ORG (e.g., names of organizations), PERSON (e.g., names of people), PHONE_NUMBER (e.g., phone numbers), PIIOTHER (e.g., personally identifiable information that does not have a dedicated tag, such as account numbers, license plate numbers. etc.), PRODUCT (e.g., product names), SPELL_OUT (e.g., the spelling of anything), SSN (e.g., social security numbers and ID numbers of other nationalities), TIME (e.g., time of day), URL (e.g., web URLs), USERINFO (e.g., user information such as emails, passwords, and usernames), ZIP_CODE (e.g., zip codes), NORMALIZE (e.g., any sequence of words that needs to be normalized but is not included in the above list), and/or other named entities. In other embodiments, it should be appreciated that the predefined named entities may include additional and/or alternative entities. For example, in another embodiment, the list of named entities may be focused on numerical entities (e.g., card number, date, phone number, social security number, currency, time of day, zip code, etc.).

In block 306, the computing system normalizes or, more specifically, attempts to normalize each of the identified entities (i.e., from the named entity recognition) using weighted finite-state transducers. In doing so, in block 308, the computing system uses a dedicated graph for each different entity type/class. In the illustrative embodiment, a dedicated graph has been constructed and is used by the computing system for a plurality of the named entity types/classes that are predefined by the named entity recognition system (e.g., all or a subset of the types/classes). For example, in an embodiment that uses the named entities described in reference to FIG. 12, the computing system may utilize a separate, dedicated graph for each of the CARD_NUMBER, CURRENCY, DATE, DATE_REL, GEO, ORG, PERSON, PHONE_NUMBER, PIIOTHER, PRODUCT, SPELL_OUT, SSN, TIME, URL, USERINFO, ZIP_CODE, and NORMALIZE entity types/classes. In such embodiments, it should be appreciated that the NORMALIZE entity type/class is a "catch all" that includes graphs for any identified entities that do not fall within one of the other classes of FIG. 12.

It should be appreciated that such dedicated graphs are both smaller and more accurate than a global normalization graph. It should be further appreciated that the technologies described herein reduce the number of errors associated with normalizing the text by normalizing only the identified entities using weighted finite-state transducers instead of normalizing the text as a whole. A common error of a normalization system that normalizes all of the text is its inability to detect cases that do not need to be normalized. By way of example, FIG. 11 illustrates various examples of input text and text that has been normalized using a global normalization graph. It should be appreciated that the outputs include errors because the text never should have been normalized, and a human reader would have preferred to read the original text. For example, the error associated with normalizing "one second" to "1 $2^{nd}$" is particularly egregious, because the term "second" is used as a measure of time in the original and not an ordinal number. Similarly, the error associated with normalizing "is seventeen twenty five and eight three four south" to "is 17:25 and 834 south" reflects another very bad normalization, as an address has been interpreted as a time of day by the global normalization graph.

In contrast, by first performing the named entity recognition as described herein, the computing system is able to overcome the challenge of detecting the portion of text associated with an entity to be normalized and also determining the type/class of such entity. For example, if the computing system has determined that "ninety pounds" in speed recognition output represents a currency, it can be normalized using a dedicated currency graph to be "£90", whereas if it represents a weight, it can be normalized using a dedicated weight graph to be "90 1b". Similarly, the computing system is able to normalize the standalone string "twelve twenty five" to be "1225" if the identified entity is an address, or "$12.25" if the identified entity is a currency (or perhaps not at all in order to avoid unrecoverable mistakes between $12.25 and $1225). Further, because the text boundaries of the identified entity are known from the named entity recognition, even if processed by weighted finite-state transducers associated with a "catch all" entity type/class (e.g., NORMALIZE from FIG. 12), the risk of errors similar to those of FIG. 11 are substantially reduced.

In block 310, the computing system determines whether each entity identified in the text was normalized using weighted finite-state transducers. If so, the method 300 may terminate. However, if the computing system determines, in block 312, that at least one entity was not normalized using weighted finite-state transducers (e.g., there were one or more rejected cases), the method 300 advances to block 314 in which the computing system normalizes the rejected cases (i.e., entities that were unable to be normalized) using a large language model. In some embodiments, to do so, the computing system may execute the method 400 of FIG. 4 described below for each of the rejected cases.

It should be appreciated that the final normalized text may be transmitted and/or displayed to a user, agent, administrator, customer, and/or other human reader depending on the particular context. For example, in some embodiments, a chatbot may output the final normalized text to the user/customer.

Although the blocks 302-314 are described in a relatively serial manner, it should be appreciated that various blocks of the method 300 may be performed in parallel in some embodiments.

Figure 4:
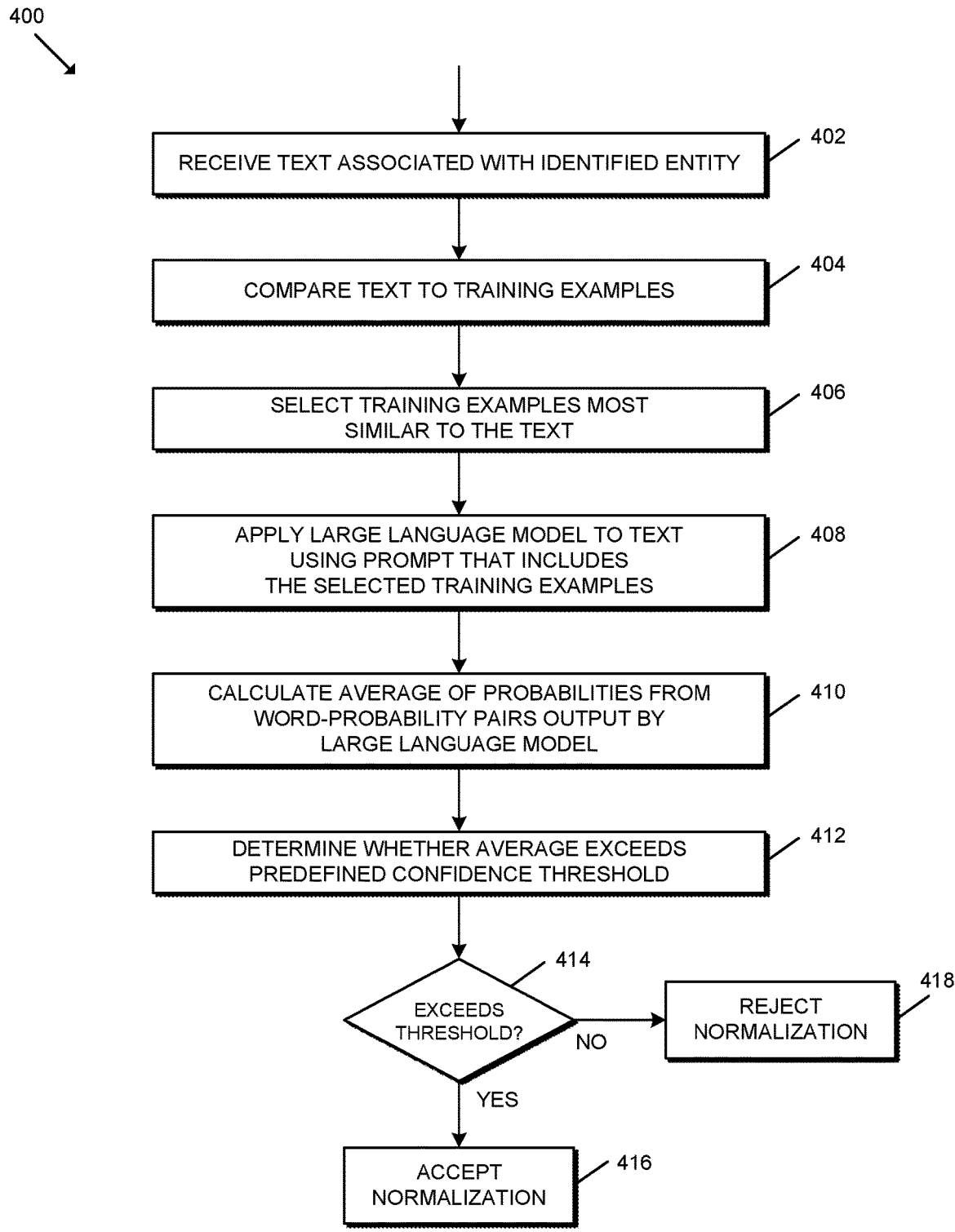
FIG. 4 is a simplified flow diagram of at least one embodiment of a method for normalizing text using a large language model.

Referring now to FIG. 4, in use, a computing system (e.g., the contact center system 100 and/or computing device 200) may execute a method 400 for normalizing text using a large language model. It should be appreciated that the particular blocks of the method 400 are illustrated by way of example, and such blocks may be combined or divided, added or removed, and/or reordered in whole or in part depending on the particular embodiment, unless stated to the contrary. In some embodiments, the method 400 may be executed with respect to each identified entity that was unable to be normalized using weighted finite-state transducers as described above.

The illustrative method 400 begins with block 402 in which the computing system receives the text associated with an identified entity. In block 404, the computing system compares the text to training examples and, in block 406, the computing system selects the training examples that are most similar to the text to be normalized. For example, in some embodiments, the computing system may select the training examples that share the most common words with the text to be normalized. Additionally, it should be appreciated that the number of training examples to be selected may vary depending on the particular embodiments. For example, in some embodiments, the computing system selects at least five training examples (e.g., 5-10 examples).

In block 408, the computing system applies a large language model to the text using a prompt that includes the selected training examples. It should be appreciated that the computing system may use any large language model suitable for performing the functions described herein (e.g., GPT-2, GPT-3, T0pp, etc.). In using a large language model for inverse text normalization, the computing system constructs a prompt and instructs the model to continue the text. FIG. 13 illustrates an example of text used to construct a prompt to normalize the date "zero nine two thousand and six". As shown, the prompt 1300 of the large language model includes an explanation 1302 of the task and a set of examples 1304 of performing the same task.

It should be appreciated that the large language model functions by predicting the next word in a sequence along with an associated probability of that word. As such, the output from the large language model may be represented as a sequence of word-probability pairs, $(w_i, p_i)$, associated with the normalized text. The occurrence of a newline character may signify the end of the normalized string.

In block 410, the computing system calculates the average of the probabilities from the word-probability pairs output by the large language model for the normalized text. In block 412, the computing system determines whether the average exceeds a predefined confidence threshold. If the computing system determines, in block 414, that the average exceeds the predefined confidence threshold, the method 400 advances to block 416 in which the computing system accepts the normalization from the large language model. However, if the computing system determines, in block 414, that the average does not exceed the predefined confidence threshold, the method 400 advances to block 418 in which the computing system rejects the normalization from the large language model. In various embodiments, the computing system may utilize different confidence thresholds depending, for example, on the desired precision and recall for the particular system. For example, in one embodiment, the computing system may utilize a predefined confidence threshold of 0.90, whereas in another embodiment, the computing system may utilize a predefined confidence threshold of 0.95.

It should be appreciated that by selecting similar examples for the large language model prompt (rather than randomly selecting examples), the computing system is able to improve the percentage of true positive results and reduce the percentage of false positive results. For example, FIG. 14 is a table that provides results from an experimental test comparing random selection to most similar selection of training examples for a large language model prompt. As shown, selection of similar examples more than doubled the true positive rate and halved the false positive rate. As referenced in FIG. 14, a true positive indicates that the model output the correct string, a false positive indicates that the model output an incorrect string, a true negative indicates that a string that should not have been normalized was not normalized, and a false negative indicates that a string that should have been normalized was not normalized.

Figure 15:
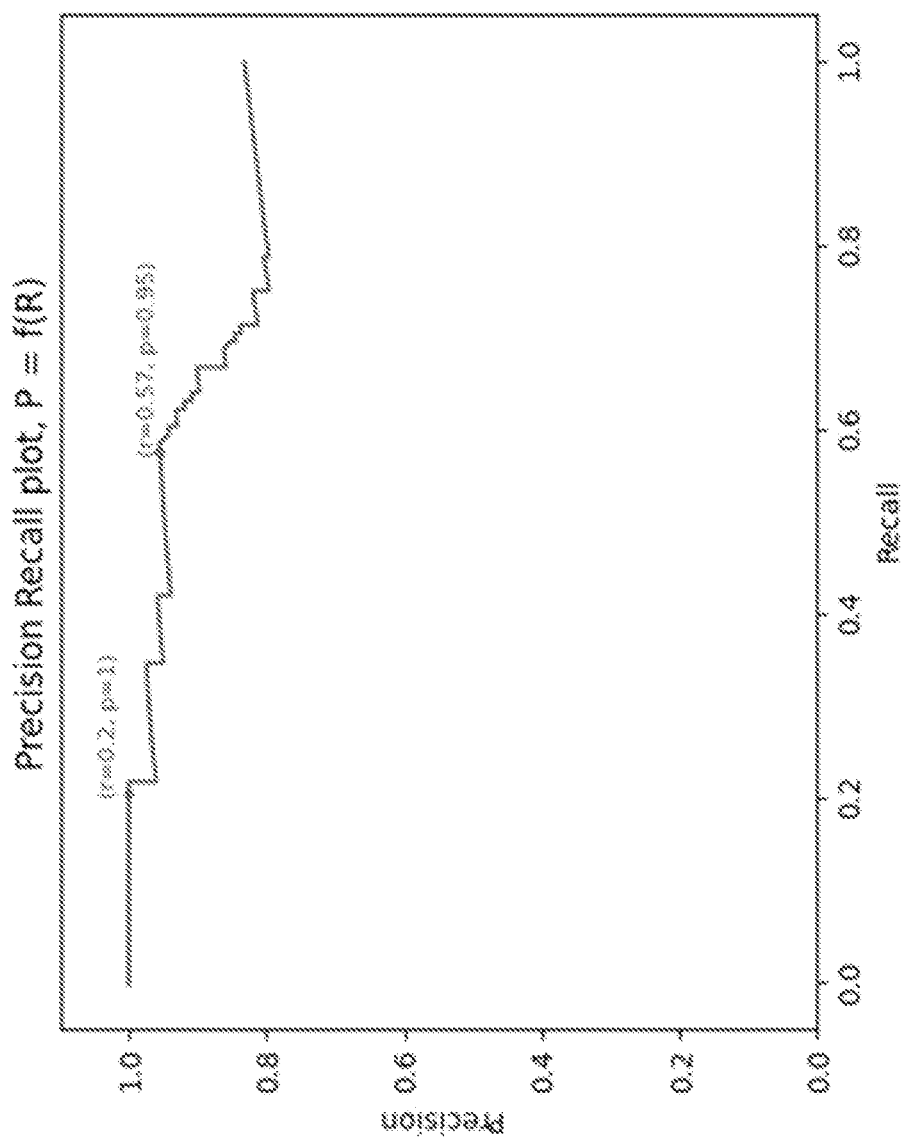
FIG. 15 is a graph based on experimental test data using large language model probabilities as confidence thresholds and plotting recall against precision.

It should be further appreciated that by leveraging the confidence threshold, the computing system may further reduce the number of false positives of the large language model. FIG. 15 is a graph based on experimental test data using large language model probabilities as confidence thresholds and plotting recall against precision. Each point represents a different confidence threshold, and the confidence creates a different precision/recall working point. As will be appreciated from FIG. 15, the use of the large language model in the manner described herein allows for recall to be increased by approximately 20% of the examples rejected from normalization by the weighed finite-state transducers without an increase in false positives.

Although the blocks 402-418 are described in a relatively serial manner, it should be appreciated that various blocks of the method 400 may be performed in parallel in some embodiments.

What is claimed is:

1. A method for inverse text normalization of contact center communications, the method comprising:
   performing named entity recognition on text from a contact center communication to identify one or more entities in the text;
   normalizing each of the identified one or more entities in the text using weighted finite-state transducers; and
   normalizing at least one entity identified in the text using a large language model in response to determining that the at least one entity identified in the text was unable to be normalized using the weighted finite-state transducers; wherein normalizing the at least one entity identified in the text using the large language model comprises:
   calculating an average of probabilities from word-probability pairs output by the large language model;
   determining whether the average exceeds a predefined confidence threshold; and
   accepting a normalization output of the large language model in response to determining that the average exceeds the predefined confidence threshold.

2. The method of claim 1, wherein the contact center communication comprises a speech-to-text transcript of at least a portion of a contact center conversation with a user.

3. The method of claim 1, wherein normalizing each of the identified one or more entities in the text using weighted finite-state transducers comprises normalizing a plurality of identified entities in the text using weighted finite-state transducers.

4. The method of claim 3, wherein normalizing the plurality of identified entities in the text using weighted finite-state transducers comprises using a dedicated graph for each entity type of the plurality of identified entities.

5. The method of claim 1, wherein normalizing the at least one entity identified in the text using the large language model comprises:
   receiving, for each entity of the at least one entity, entity text associated with the respective entity identified in the text;
   comparing the entity text to a set of training examples for the large language model;
   selecting training examples from the set of training examples that are most similar to the entity text; and
   applying the large language model to the entity text using a large language model prompt that includes the selected training examples.

6. The method of claim 5, wherein selecting the training examples from the set of training examples that are most similar to the entity text comprises selecting training examples from the set of training examples that share the most common words.

7. The method of claim 6, wherein selecting the training examples from the set of training examples that are most similar to the entity text comprises selecting at least five training examples.

8. The method of claim 1, further comprising rejecting the normalization output of the large language model in response to determining that the average does not exceed the predefined confidence threshold.

9. The method of claim 1, wherein performing the named entity recognition on the text from the contact center communication to identify the one or more entities in the text comprises identifying at least one of a date, a phone number, a currency, a social security number, a time of day, or a zip code.

10. A computing system for inverse text normalization of contact center communications, the computing system comprising:
   at least one processor; and
   at least one memory comprising a plurality of instructions stored thereon that, in response to execution by the at least one processor, causes the computing system to:
      perform named entity recognition on text from a contact center communication to identify one or more entities in the text;
      normalize each of the identified one or more entities in the text using weighted finite-state transducers; and
      normalize at least one entity identified in the text using a large language model in response to a determination that the at least one entity identified in the text was unable to be normalized using the weighted finite-state transducers; wherein to normalize the at least one entity identified in the text using the large language model comprises to:
         calculate an average of probabilities from word-probability pairs output by the large language model;
         determine whether the average exceeds a predefined confidence threshold;
         accept a normalization output of the large language model in response to a determination that the average exceeds the predefined confidence threshold; and
         reject the normalization output of the large language model in response to a determination that the average does not exceed the predefined confidence threshold.

11. The computing system of claim 10, wherein the contact center communication comprises a speech-to-text transcript of at least a portion of a contact center conversation with a user.

12. The computing system of claim 10, wherein to normalize each of the identified one or more entities in the text using weighted finite-state transducers comprises to normalize a plurality of identified entities in the text using weighted finite-state transducers.

13. The computing system of claim 12, wherein to normalize the plurality of identified entities in the text using weighted finite-state transducers comprises to use a dedicated graph for each entity type of the plurality of identified entities; and
   wherein the plurality of identified entities represents a plurality of different entity types.

14. The computing system of claim 10, wherein to normalize the at least one entity identified in the text using the large language model comprises to:
   receive, for each entity of the at least one entity, entity text associated with the respective entity identified in the text;
   compare the entity text to a set of training examples for the large language model;
   select training examples from the set of training examples that are most similar to the entity text; and
   apply the large language model to the entity text using a large language model prompt that includes the selected training examples.

15. The computing system of claim 14, wherein to select the training examples from the set of training examples that are most similar to the entity text comprises to select training examples from the set of training examples that share the most common words.

16. One or more non-transitory machine-readable storage media comprising a plurality of instructions stored thereon that, in response to execution by a processor, causes a computing system to:
   perform named entity recognition on text from a contact center communication to identify a plurality of entities in the text;
   normalize each entity of the plurality of entities identified in the text using weighted finite-state transducers and using a dedicated graph for each entity type of the plurality of entities identified in the text;
   determine that at least one entity identified in the text was unable to be normalized using the weighted finite-state transducers; and
   normalize the at least one entity identified in the text using a large language model; wherein to normalize the at least one entity identified in the text using the large language model comprises to:
      calculate an average of probabilities from word-probability pairs output by the large language model;
      determine whether the average exceeds a predefined confidence threshold;
      accept a normalization output of the large language model in response to a determination that the average exceeds the predefined confidence threshold; and
      reject the normalization output of the large language model in response to a determination that the average does not exceed the predefined confidence threshold.

17. The one or more non-transitory machine-readable storage media of claim 16, wherein to normalize the at least one entity identified in the text using the large language model comprises to:
   receive, for each entity of the at least one entity, entity text associated with the respective entity identified in the text;
   compare the entity text to a set of training examples for the large language model;
   select training examples from the set of training examples that are most similar to the entity text; and
   apply the large language model to the entity text using a large language model prompt that includes the selected training examples.

* * * * *